United States Patent [19]
Uhlig

[11] 3,886,964
[45] June 3, 1975

[54] SHUTOFF APPARATUS

[75] Inventor: Klaus Uhlig, Zurich, Switzerland

[73] Assignee: Brown Boveri-Sulzer Turbomaschinen Aktiengesellschaft, Zurich, Switzerland

[22] Filed: Nov. 12, 1973

[21] Appl. No.: 415,130

[30] Foreign Application Priority Data
Nov. 17, 1972 Switzerland.......................... 16762

[52] U.S. Cl. ................ 137/340; 251/124; 251/328; 251/329
[51] Int. Cl. .......................................... F16k 49/00
[58] Field of Search ............ 137/340; 251/123, 124, 251/328, 329, 327

[56] References Cited
UNITED STATES PATENTS

| | | | |
|---|---|---|---|
| 2,868,013 | 1/1959 | Terrell ............................ | 251/124 X |
| 3,206,162 | 9/1965 | Bogot .......................... | 251/327 |
| 3,213,876 | 10/1965 | Manton........................... | 137/340 |
| 3,266,517 | 8/1966 | Carr................................... | 137/340 |
| 3,724,490 | 4/1973 | Kramer.............................. | 137/340 |

FOREIGN PATENTS OR APPLICATIONS
645,435   6/1937   Germany

*Primary Examiner*—Henry T. Klinksiek
*Attorney, Agent, or Firm*—Robert A. Ostmann

[57] ABSTRACT

A shutoff apparatus on a conduit conveying a medium at high temperature and under high pressure, more particularly for a nuclear power plant having a gas-cooled reactor; a shutoff member comprises two closure walls defining a barrier chamber in a duct for the medium; a partition wall extending between the planes of the closure walls divides the space of a housing of the apparatus from the external wall of the housing to the duct into two part-chambers; means are provided for filling the barrier chamber by means of a barrier medium and keeping the pressure thereof in the barrier chamber higher than the pressure in the two part-chambers; suitable sealing elements between the housing and the closure walls are shown too.

9 Claims, 3 Drawing Figures

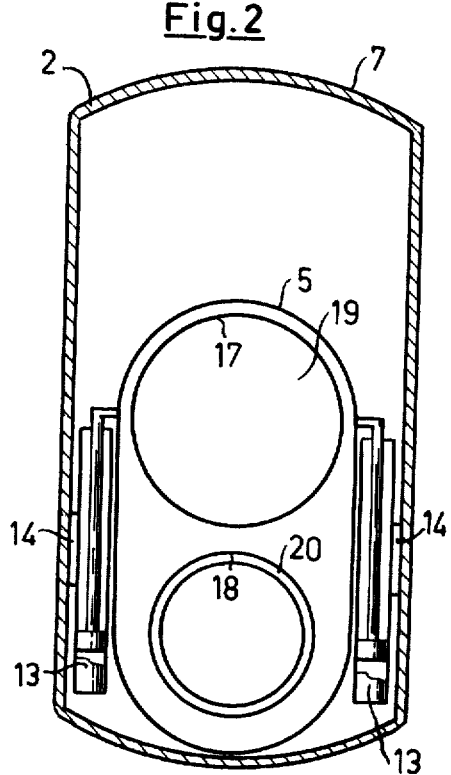
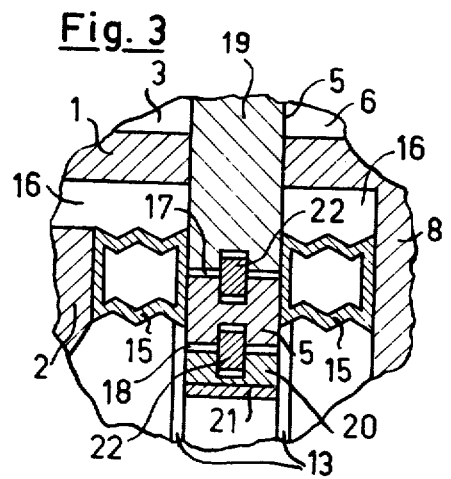

3,886,964

SHUTOFF APPARATUS

BACKGROUND OF THE INVENTION

The invention relates to a shutoff apparatus on a conduit conveying a medium at a high temperature and under a high pressure, more particularly for a nuclear power plant with gas-cooled reactor, the said shutoff apparatus comprising a housing with a duct for the medium, a shutoff member arranged in the housing for closing and opening the duct, the said member being adapted to be adjusted by means of an adjusting device, and sealing elements between the housing and the shutoff member.

In the circuitry of nuclear power plants using a gas-cooled reactor, conduits and shutoff apparatus are subjected to high temperatures and high internal pressures.

In nuclear power plants using gas-cooled reactors wherein in the so-called single-circuit system, a medium is used in the reactor part of the circuit as a cooling medium and the same medium is used directly in the remaining part of the circuit as an operating medium for a gas turbine, additional requirements are expected more particularly with regard to the sealing-tightness of the shutoff members. This is because in a single-circuit system the medium may become contaminated throughout the circuit by radio-active fission products or by active particles.

A shutoff apparatus which is situated for example between the reactor and the turbine has to achieve the following objects:

a. in normal operation, the shutoff member of the said apparatus is in the open position, the duct is open, and the reactor part is connected directly with the remaining part of the circuit;

b. after the reactor is shut off, during so-called heat transfer, the shutoff member of the shutoff apparatus is in the closing position and the reactor part is separated from the remaining part of the circuit;

c. during inspections, maintenance or repair work in the other part of the circuit, for example at the turbine, the shutoff member of the shutoff apparatus is in the closing position and separates the reactor part from the remaining part of the circuit. It must be ensured that no medium which has been contaminated with radioactive agents can penetrate from the reactor part into the separated part of the circuit which has already been purified for the aforesaid work to be carried out. This effect specified under c) cannot be achieved in a satisfactory manner by means of the conventional shutoff apparatus.

SUMMARY OF THE INVENTION

The invention has as its object to provide a shutoff apparatus wherein in the closing position of the shutoff member not only is the duct closed for the medium, but not even traces of contaminated medium can pass through.

In a shutoff apparatus of the kind initially described, this is achieved in that the shutoff member comprises two closure walls which in the closing position of the shutoff member close the duct one behind the other and in so doing define in the duct a barrier chamber, and also that the space within the housing from the external wall of the housing as far as the duct is divided by means of a partition wall extending between the planes of the closure walls closing the duct into two part-chambers, and that means are also provided for filling the barrier chamber by means of a confining or barrier medium, and the pressure thereof is kept higher in the barrier chamber than in the two part-chambers.

It is advantageous to provide each of the part-chambers with an aperture for discharging the barrier medium or the main medium also, and to arrange the adjusting device of the shutoff member in the housing, and also to make the barrier medium and the medium conducted in the conduit identical to one another, although from the quality point of view the barrier medium differs from the main medium by its purity.

BRIEF DESCRIPTION OF THE DRAWING

The invention will be described in detail hereinafter with reference to simplified drawings showing constructional examples. In the drawings:

FIG. 2 shows the same constructional example but in a section taken on the line II-II of FIG. 1.

FIG. 3 shows the detail indicated by the ring III from FIG. 1 on a larger scale.

DESCRIPTION OF THE PREFERRED EMBODIMENTS

Figure 1:
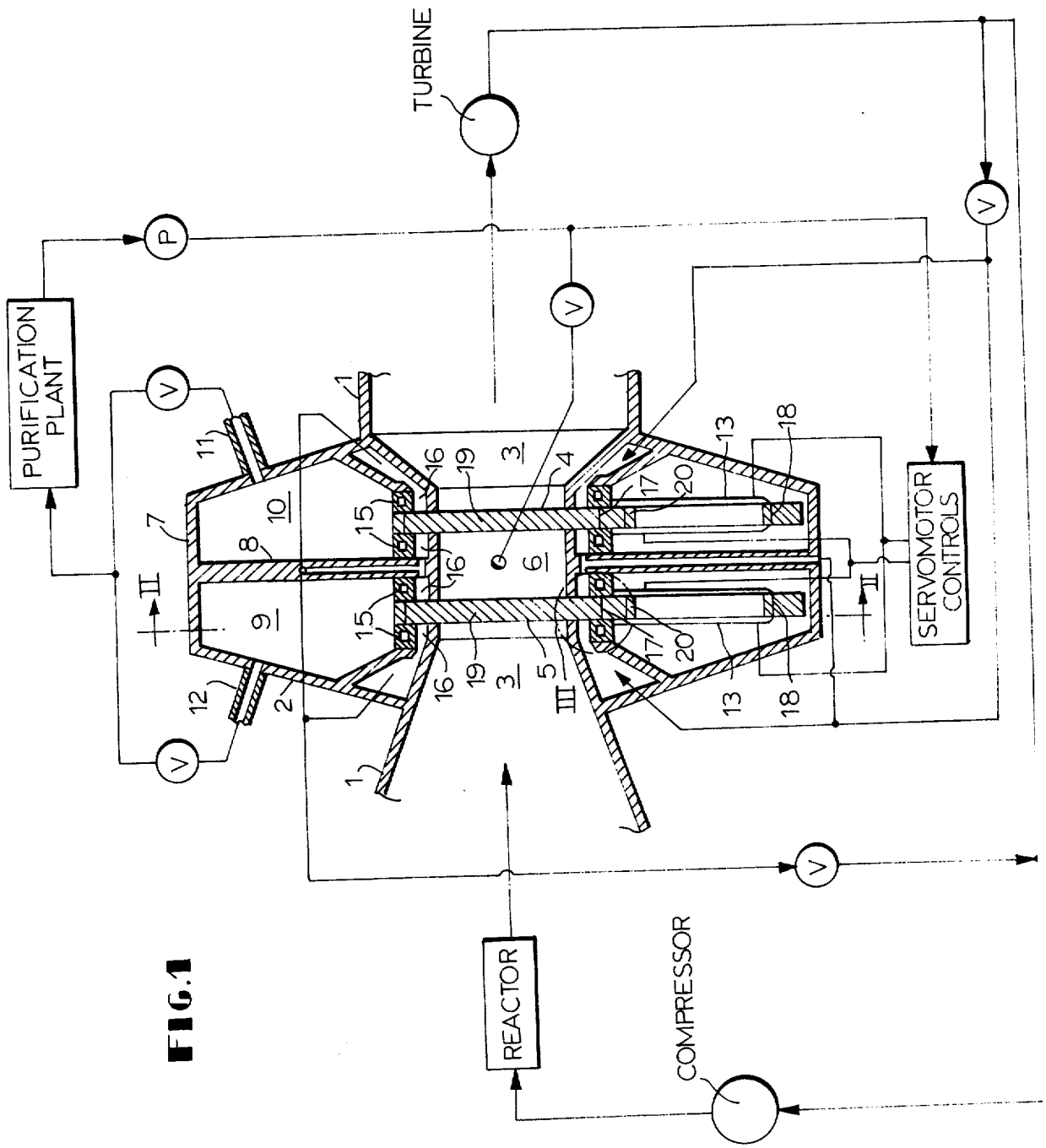
FIG. 1 is an axial sectional view of the improved shutoff device which includes a schematic showing of the system in which it is employed.

A shutoff apparatus having a housing 2 is arranged on a conduit 1. The conduit 1 is part of a circuit of a nuclear power plant, and conveys helium with radioactive contamination and under high pressure and at a high temperature.

The housing 2 comprises a duct 3 for the medium. Arranged in the housing 2 is a shutoff member comprising two closure walls 4 and 5. In the closing position of the shutoff member, the closure walls 4 and 5 close the duct 3 one behind the other in the direction of flow of the medium. In the drawing, the closure walls 4 and 5 are shown in the closing position. In the closing position the closure walls 4 and 5 define in the duct 3, between one another, a barrier chamber 6.

The space in the housing 2 from the external wall 7 of the housing 2 to the duct 3 is divided into two part-chambers 9 and 10 by means of a partition wall 8 which is situated between the planes of the closure walls 4 and 5 which close the duct 3. Means are provided for filling the barrier chamber 6 by means of a barrier medium and for holding a higher pressure of barrier medium in the barrier chamber 6 than prevails in the two part-chambers 9 and 10.

The two part-chambers 9 and 10 are each provided with an aperture 11, 12 respectively. These apertures 11, 12 permit the barrier medium which has entered the part-chambers 9, 10 from the barrier chamber 6, and also the medium which has entered the part-chambers 9, 10 from the duct 3 to escape from the part-chambers 9, 10.

The barrier medium for filling the barrier chamber 6 and the medium conveyed in the conduit 1 are the same as one another, but the barrier medium differs from the main medium by its purity. In the present case the medium conveyed in the conduit 1 is helium, the barrier medium being pure helium. The pure helium mixes in the part-chamber 10 (or in the part-chamber 9) with the radioactively contaminated helium which has entered there from the conduit 1 or from the duct 3, and is conveyed through the apertures 11 and 12 respectively from the part-chambers into a purification plant for the helium and then, purified therein, returned again as a barrier medium into the barrier chamber 6. An adjusting device for moving the shutoff member into the closing or opening position respectively is arranged in the housing 2. Of the adjusting device, the drawing shows servomotors 13 in the part-chambers 9, 10 which are secured by means of brackets 14 to the housing 2. The servomotors 13 of the adjusting device are supplied with pure helium, like the barrier chamber 6.

In order to keep the shutoff apparatus small in size and to limit the mass flow in the case of a pipe fracture, the part of the conduit 1 on which the shutoff apparatus with the housing 2 and the duct 3 is arranged, has the shape of a venturi tube. The shutoff member with the closure walls 4, 5 is situated in the narrowest zone of this venturi tube. Sealing elements 15 are arranged between the housing 2 and the closure walls 4, 5 of the shutoff member. These are annular bellows-type sealing elements and are adapted to be pressed against the closure walls 4, 5 when these are in the closing or opening position.

Provided in the housing 2 are chambers 16 which adjoin the configuration of the duct 3 in the radially external direction. These chambers are capable of being supplied with a cooling medium, whereby the bellows sealing elements and also the remainder of the space in the housing 2 are protected from the high temperature of the medium (helium) flowing in the duct 3. As cooling medium there is used in these chambers 16 the same medium as that which is conveyed in the conduit 1, but in a cooler condition. In the present case, therefore, helium is used which is supplied from a relatively cool portion of the circuit of the power plant into these chambers 16 by way of a conduit. Cooling is carried out when the closure walls 4, 5 are in the open position.

As is shown in FIG. 2 more particularly and in detail in FIG. 3, the closure walls 4, 5 of the shutoff member, constructed as a gate valve, are each provided with two circular apertures 17 and 18. The circular apertures 17 which are situated in the closing position in the duct 3 are each filled with a solid disc 19. The circular apertures 18 are each provided with an annular disc 20. These annular discs 20 are provided on the inner side, considered in the radial direction, with a particularly heat-resistant layer 21. The solid discs 19 and the annular discs 20 are in each case held in the partition walls 4, 5 respectively and sealed relatively to the partition walls 4, 5 respectively by means of radially mobile sealing elements 22.

I claim:

1. Shutoff apparatus for a conduit conveying a high temperature, high pressure medium comprising
    a. a housing including a duct for said medium and an external wall spaced therefrom;
    b. a pair of adjustable gates in the housing movable between two positions in which, respectively, they close and open the duct, and which, in the closed position, bound a barrier chamber within the duct;
    c. a supply passage through which a barrier medium may be delivered to the barrier chamber;
    d. a partition located between the planes of the gates and extending between the duct and the external wall to thereby divide the intervening space into two sub-chambers;
    e. a discharge passage for leading medium out of each sub-chamber;
    f. actuating means situated wholly within the housing and serving to move the gates between said two positions;
    g. sealing elements reacting between the housing and the gates and effective to inhibit leakage of medium along and from the duct in said closed position and to inhibit leakage of medium from the duct in said open position;
    h. cooling chambers interposed between the sealing elements and the duct and bounded in part by portions of the gates in both of said open and closed positions; and
    i. cooling passage means through which a cooling medium may be passed through the cooling chambers.

2. Shutoff apparatus as defined in claim 1 in which said duct has the profile of a venturi tube; and the gates are situated at the narrowest cross section of this tube.

3. Shutoff apparatus as defined in claim 1 in which said sealing elements are annular bellows which are adapted to be pressed against the gates.

4. Shutoff apparatus as defined in claim 1 in which each gate includes
    a. a plate pierced by first and second apertures which register with the duct in the closed and open positions, respectively;
    b. a solid disc filling the first aperture;
    c. a ring fitted in the second aperture; and
    d. radially mobile sealing elements holding the disc and ring in the apertures and sealing the joints between these parts.

5. Shutoff apparatus as defined in claim 1 including means for supplying a barrier medium to the barrier chamber and for maintaining therein a pressure greater than the pressures in said sub-chambers.

6. Shutoff apparatus as defined in claim 5 in which the means for supplying barrier medium delivers to the barrier chamber a purified form of said high temperature, high pressure medium.

7. Shutoff apparatus as defined in claim 5 in which said actuating means is of the fluid pressure operated type; and which includes means for delivering said barrier medium as the motive fluid for the actuating means.

8. Shutoff apparatus as defined in claim 1 including means for circulating a cooling medium through the cooling chambers.

9. Shutoff apparatus as defined in claim 8 in which the means for circulating a cooling medium supplies a cooled form of said high temperature, high pressure medium.

* * * * *